(12) United States Patent
Miyagoe

(10) Patent No.: US 7,810,404 B2
(45) Date of Patent: Oct. 12, 2010

(54) SYNCHRONIZING MECHANISM AND TRANSMISSION HAVING THE SAME

(75) Inventor: Hironori Miyagoe, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 707 days.

(21) Appl. No.: 11/764,338

(22) Filed: Jun. 18, 2007

(65) Prior Publication Data

US 2008/0004155 A1 Jan. 3, 2008

(30) Foreign Application Priority Data

Jul. 3, 2006 (JP) .............................. 2006-183942

(51) Int. Cl.
*F16H 57/04* (2010.01)
(52) U.S. Cl. .................... 74/339; 74/473.36; 192/113.5
(58) Field of Classification Search .............. 192/113.5; 74/339, 473.36
See application file for complete search history.

(56) References Cited

U.S. PATENT DOCUMENTS

| | | | | |
|---|---|---|---|---|
| 1,830,744 A * | 11/1931 | Logue | .......................... | 192/57 |
| 2,201,169 A * | 5/1940 | Griswold | ............... | 192/53.361 |
| 2,319,740 A | 5/1943 | Lapsley et al. | | |
| 2,395,189 A | 2/1946 | Lapsley et al. | | |
| 2,640,573 A * | 6/1953 | Shenk | ...................... | 192/53.32 |
| 3,587,783 A * | 6/1971 | Walters | ..................... | 184/11.1 |
| 5,038,628 A * | 8/1991 | Kayama | ....................... | 74/339 |
| 6,206,140 B1 * | 3/2001 | Craft et al. | ..................... | 184/8 |
| 6,910,398 B2 * | 6/2005 | Fegg | ........................... | 74/359 |
| 2003/0111313 A1 * | 6/2003 | Fernandez | ............... | 192/48.91 |
| 2009/0042685 A1 * | 2/2009 | Ohmori et al. | .............. | 475/159 |

FOREIGN PATENT DOCUMENTS

| | | |
|---|---|---|
| CA | 1211384 | 9/1986 |
| DE | 3238780 C1 | 1/1984 |
| DE | 19858987-A14 | 6/2000 |
| JP | H01-100957 U | 7/1989 |
| JP | H05-302660 A | 11/1993 |
| JP | 2009-185838 | * 8/2009 |

* cited by examiner

*Primary Examiner*—Sherry Estremsky
(74) *Attorney, Agent, or Firm*—Global IP Counselors, LLP

(57) ABSTRACT

A synchronizing mechanism includes a synchronizer hub, a coupling sleeve, a clutch gear and a synchronizer ling. The synchronizer hub is fixedly coupled to a rotational shaft. The coupling sleeve is coupled to an outer circumference of the synchronizer hub with a spline engagement to slide with respect to the rotational shaft in an axial direction upon an operation of a shift fork. The clutch gear is rotatably supported on the rotational shaft. The synchronizer ring is configured and arranged to produce a synchronized load between the coupling sleeve and the clutch gear. The coupling sleeve includes a guide section configured and arranged to guide at least a portion of lubricating oil supplied from a shift fork engagement part of the coupling sleeve toward at least one of the clutch gear and the synchronizer ring.

12 Claims, 12 Drawing Sheets

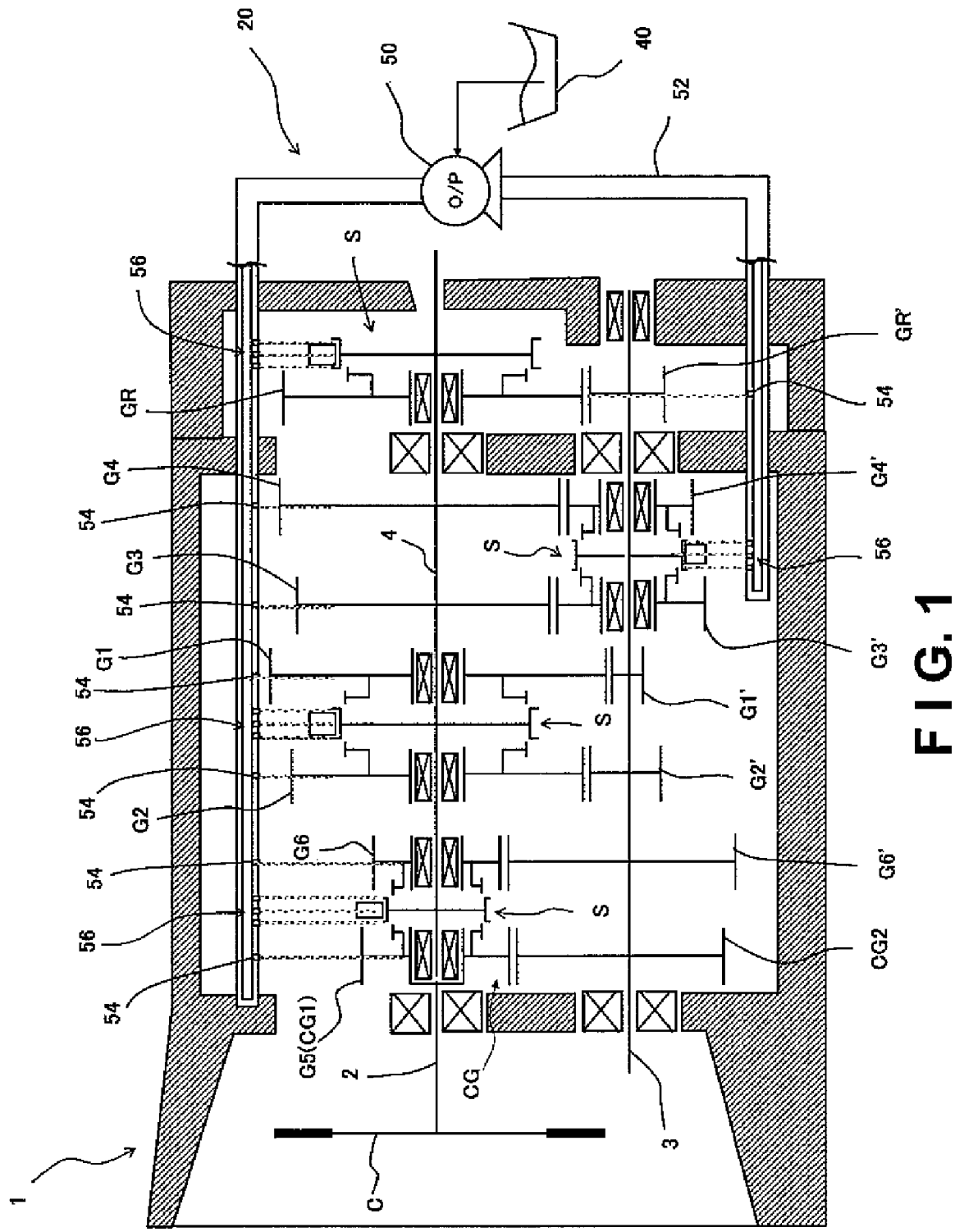
F I G. 1

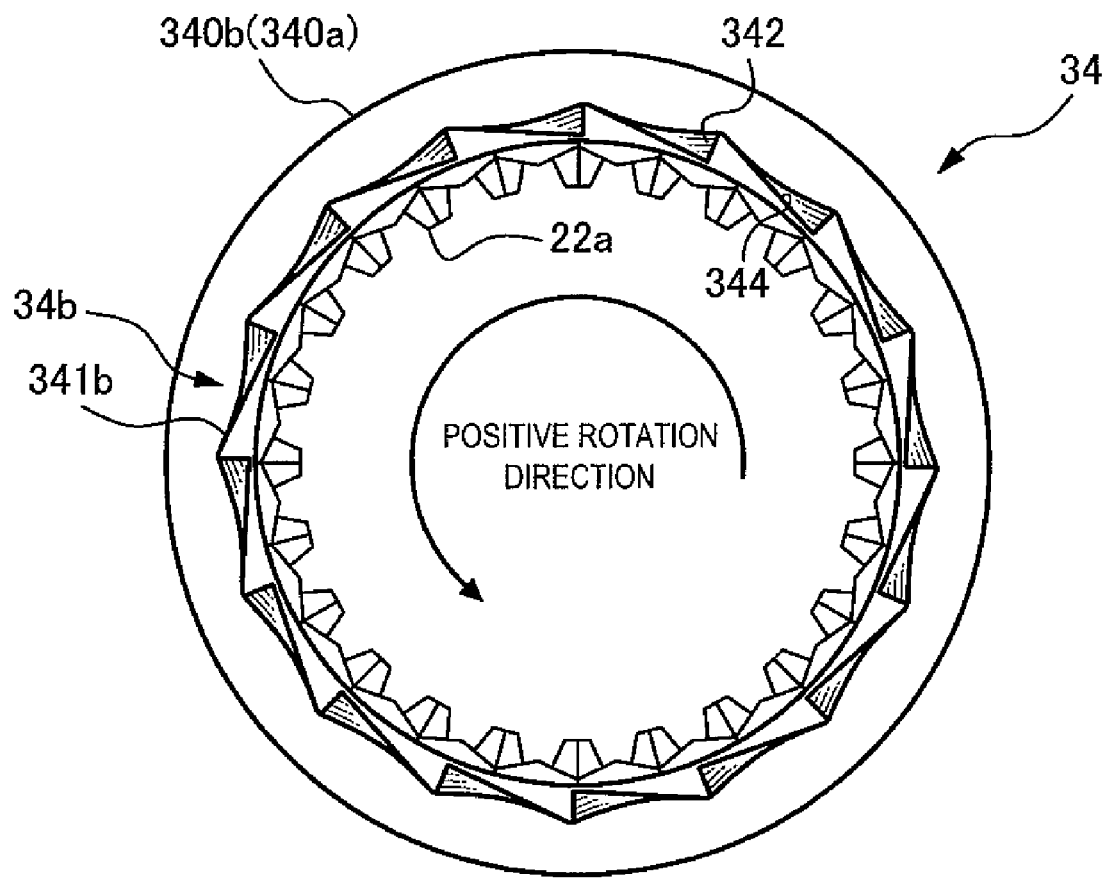
F I G. 4

SYNCHRONIZING MECHANISM AND TRANSMISSION HAVING THE SAME

CROSS-REFERENCE TO RELATED APPLICATIONS

This application claims priority to Japanese Patent Application No. 2006-183942, filed on Jul. 3, 2006. The entire disclosure of Japanese Patent Application No. 2006-183942 is hereby incorporated herein by reference.

BACKGROUND OF THE INVENTION

1. Field of the Invention

The present invention relates to a synchronizing mechanism and a transmission having the synchronizing mechanism.

2. Background Information

Japanese Laid-Open Utility Model Patent Application No. H01-100957 discloses a conventional transmission having a synchronizing mechanism in which an oil supply pipe is used to supply lubricating oil discharged by an oil pump to the synchronizing mechanism. More specifically, the lubricating oil is supplied to an engagement surface of a coupling sleeve that engages with a shift fork and to parts disposed adjacent to side surfaces of the coupling sleeve (i.e., a synchronizer ring, a clutch gear, and the like).

In such conventional transmission, the oil supply pipe includes a plurality of aperture parts for supplying the lubricating oil at positions that correspond to positions of the coupling sleeve when the coupling sleeve is in, for example, a neutral state and gear-shifting states, respectively. Thus, when the lubricating oil is supplied to the engagement surface of the coupling sleeve that engages with the shift fork from one of the aperture parts of the oil supply pipe, the lubricating oil can be supplied to the synchronizer ring and the clutch gear from the other aperture parts.

In view of the above, it will be apparent to those skilled in the art from this disclosure that there exists a need for improved synchronizing mechanism and transmission having the same. This invention addresses this need in the art as well as other needs, which will become apparent to those skilled in the art from this disclosure.

SUMMARY OF THE INVENTION

An axial length of a coupling sleeve of a synchronizing mechanism varies depending on the size of the synchronizing mechanism. In the conventional transmission disclosed in the above-mentioned reference, however, depending on the axial length of the coupling sleeve, the lubricating oil may not be properly supplied to the synchronizer ring and the clutch gear from the aperture parts other than the aperture part that supplies the lubricating oil to the engagement surface of the coupling sleeve. In such case, an additional aperture part or aperture parts for supplying the lubricating oil to the synchronizer ring and the clutch gear may be provided to the oil supply pipe. However, the lubricating oil supplied from the other aperture parts (i.e., the aperture parts other than the aperture parts that supply the lubricating oil to the engagement surface of the coupling sleeve, the synchronizer ring, the clutch gear, and the like) would be wasted.

Accordingly, one object of the present invention is to provide a synchronizing mechanism that can properly supply lubricating oil to a synchronizer ring and a clutch gear as well as a shift fork engagement part of a coupling sleeve. Another object of the present invention is to provide a transmission in which the lubricating oil is used efficiently.

In order to achieve the above object of the present invention, a synchronizing mechanism includes a synchronizer hub, a coupling sleeve, a clutch gear and a synchronizer ling. The synchronizer hub is fixedly coupled to a rotational shaft. The coupling sleeve is coupled to an outer circumference of the synchronizer hub with a spline engagement to slide with respect to the rotational shaft in an axial direction upon an operation of a shift fork. The clutch gear is rotatably supported on the rotational shaft. The synchronizer ring is configured and arranged to produce a synchronized load between the coupling sleeve and the clutch gear. The coupling sleeve includes a guide section configured and arranged to guide at least a portion of lubricating oil supplied from a shift fork engagement part of the coupling sleeve toward at least one of the clutch gear and the synchronizer ring.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a simplified overall schematic view of a transmission having a synchronizing mechanism in accordance with a first embodiment of the present invention;

FIG. 4 is an enlarged simplified front elevational view of the synchronizer sleeve as viewed in a direction of an arrow 4 in FIG. 3 that is substantially parallel to the rotational shaft in accordance with the first embodiment of the present invention;

DETAILED DESCRIPTION OF THE PREFERRED EMBODIMENTS

Figure 2:
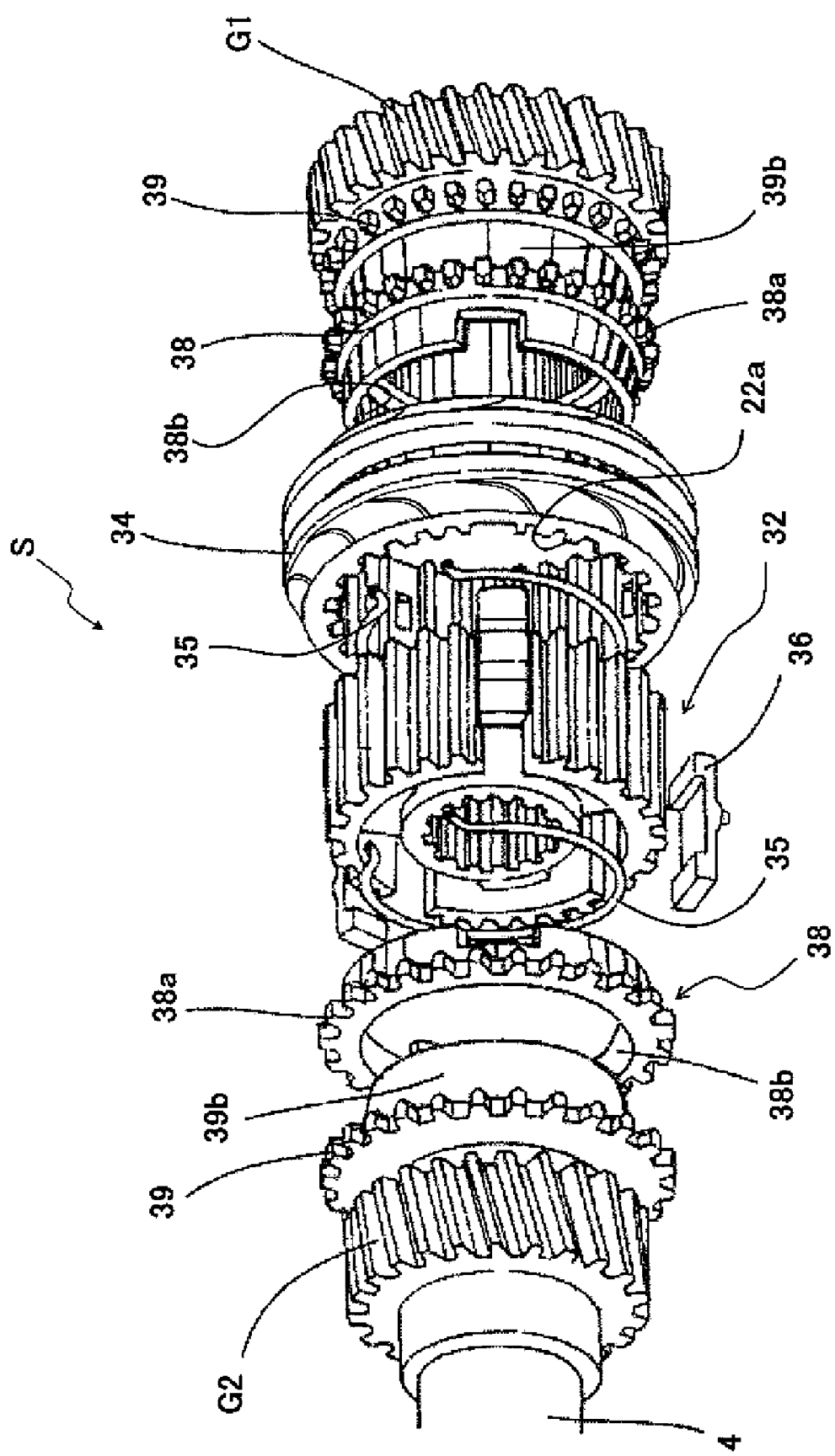
FIG. 2 is a schematic exploded view of a synchronizing device in accordance with the first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a transmission 1 having a synchronizing mechanism is illustrated in accordance with a first embodiment of the present invention.

FIG. 1 is a simplified overall schematic view of the transmission 1 having the synchronizing mechanism of the first embodiment.

As shown in FIG. 1, the transmission 1 of the first embodiment includes an input shaft 2, a clutch C, a counter shaft 3 (rotational shaft), a counter-gear mechanism CG, an output shaft 4 (rotational shaft), a lubricating oil supplying system 20 and a transmission mechanism. The input shaft 2 is connected to the clutch C. The counter shaft 3 is connected to the input shaft 2 via the counter-gear mechanism CG. The output shaft 4 has one axial end coaxially fitted into the input shaft 2. The transmission mechanism includes a plurality of driving gears G1, G2, G3, G4, G6 and GR positioned on the counter shaft 3, a plurality of driven gears G1', G2', G3', G4', G6' and GR' positioned on the output shaft 4, and a plurality of synchronizing devices S. The transmission mechanism is configured and arranged to couple the counter shaft 3 and the output shaft 4 so that the rotation of the input shaft 2 is transmitted to the output shaft 4 with different speeds. The lubricating oil supplying system 20 is configured and arranged to supply lubricating oil to the transmission mechanism.

As shown in FIG. 1, the counter-gear mechanism CG includes a reduction driving gear CG1 and a reduction driven gear CG2. The reduction driving gear CG1 is arranged on and secured to an axial end portion of the input shaft 2 on a unit-rear side that is opposite from the clutch C. As used herein, the "unit-front side" in the transmission 1 refers generally to a side where the clutch C is located in the transmission 1 and the "unit-rear side" in the transmission refers generally to a side opposite from a side where the clutch C is located. The reduction driving gear CG1 also functions as a fifth-speed driving gear G5. The reduction driven gear CG2 engages with the reduction driving gear CG1, and the reduction driven gear CG2 is arranged on and secured to the counter shaft 3 on the unit front-side as seen in FIG. 1. The counter-gear mechanism CG is configured and arranged to transmit the rotation of the input shaft 2 to the counter shaft 3 as the rotational speed being reduced (decelerated).

As mentioned above, the transmission mechanism includes the driving gears G1, G2, G3, G4, G6 and GR positioned on the counter shaft 3, the driven gears G1', G2', G3', G4', G6' and GR' positioned on the output shaft 4, and the synchronizing devices S. As shown in FIG. 1, the driven gears G1', G2', G3', G4', G6' and GR' engage with the driving gears G1, G2, G3, G4, G6 and GR, respectively. The synchronizing devices S are configured and arranged to selectively connect one of the driving gears G1, G2, G6 and GR and the driven gears G3' and G4' that are arranged as idler gears to the corresponding one of the counter shaft 3 and the output shaft 4 to obtain a requested gear speed. Thus, the transmission mechanism is configured and arranged to transmit the rotation of the input shaft 2 to the output shaft 4 using one of the prescribed gear ratios of the driving gears G1, G2, G3, G4, G6 and GR and the driven gears G1', G2', G3', G4', G6' and GR', respectively. Moreover, when the synchronizing device S is configured and arranged to fixedly couple the reduction driving gear CG1 (driving gear G5) to the output shaft 4, the input shaft 2 is directly connected to the output shaft 4.

As shown in FIG. 1, the lubricating oil supplying system 20 includes a conventional oil pump 50, an oil pan 40 and an oil supply pipe 52. The oil pump 50 is configured and arranged to siphon and discharge the lubricating oil in the oil pan 40. The oil supply pipe 52 forms a channel for conveying the lubricating oil discharged by the oil pump 50 to the transmission mechanism in the transmission 1. The oil supply pipe 52 includes a plurality of through holes 54 and 56 (aperture parts). More specifically, the through holes 54 are formed in positions that correspond to the engagement surfaces of the driving gears (e.g., G1, G2, G3, G4, G5, G6 and GR) and the driven gears (e.g., G1', G2', G3', G4', CG2, G6' and GR'). The through holes 56 are formed in positions that correspond to positions of the synchronizing devices S in a neutral state and gear-shifting states. Therefore, the engagement surfaces of the driving gears (e.g., G1, G2, G3, G4, G5, G6 and GR) and the driven gears (e.g., G1', G2', G3', G4', CG2, G6' and GR') and the synchronizing devices S are lubricated using the lubricating oil flowing out from the through holes 54 and 56.

FIG. 2 is a schematic exploded view of the synchronizing device S disposed between the driving gears G1 and G2 in accordance with the first embodiment of the present invention FIG. 2. In the first embodiment, all of the synchronizing devices S of the transmission 1 basically have identical structures. Therefore, only the structure and operation of the synchronizing device S disposed between the driving gears G1 and G2 will be explained in detail for the sake of brevity.

As shown in FIG. 2, the synchronizing device S includes a synchronizer hub 32, a synchronizer sleeve 34 (coupling sleeve), a pair of synchronizer springs 35, a plurality of synchronizer keys 36, a pair of synchronizer rings 38, a pair of clutch gears 39.

The synchronizer hub 32 is fixedly coupled to the output shaft 4 with a spline engagement so as to rotate integrally with the output shaft 4. The synchronizer sleeve 34 is disposed on the outer circumferential surface of the synchronizer hub 32. The synchronizer sleeve 34 includes a spline surface 22a on the inner circumferential surface thereof, which is configured and arranged to form a spline engagement with the outer circumferential surface of the synchronizer hub 32. The synchronizer sleeve 34 is movable in the axial direction with respect to the output shaft 4. The synchronizer keys 36 are interposed between the synchronizer hub 32 and the synchronizer sleeve 34. The synchronizer keys 36 are urged or biased toward the synchronizer sleeve 34 by the synchronizer springs 35. Each of the synchronizer rings 38 has a ring spline 38a formed on the outer circumferential surface thereof and a friction cone (conical) surface 38b formed on the inner circumferential surface thereof. The clutch gears 39 are formed integrally with axial side surfaces of the driving gears G1 and G2 facing the synchronizer hub 32, respectively, that are arranged as idler gears. Each of the clutch gears 39 has a friction cone (conical) surface 39b that slides against the friction cone surface 38b of the synchronizer ring 38.

The synchronizing device S is configured and arranged to fixedly couple one of the driving gears G1 and G2 that are arranged as the idler gears to the output shaft 4 while the rotation of the selected gear is synchronized with the rotation of the output shaft 4 upon the axial movement of the synchronizer sleeve 34. As for the synchronizing device S disposed between the reduction driving gear CG1 (driving gear G5) and the driving gear G6, the synchronizing device S is configured and arranged to fixedly couple the reduction driving gear CG1 to the output shaft 4 while the rotation of the reduction driving gear CG1 is synchronized with the rotation of the output shaft 4. In such case, the synchronizing device S is configured and arranged to directly connect the input shaft 2 and the output shaft 4.

Figure 3:
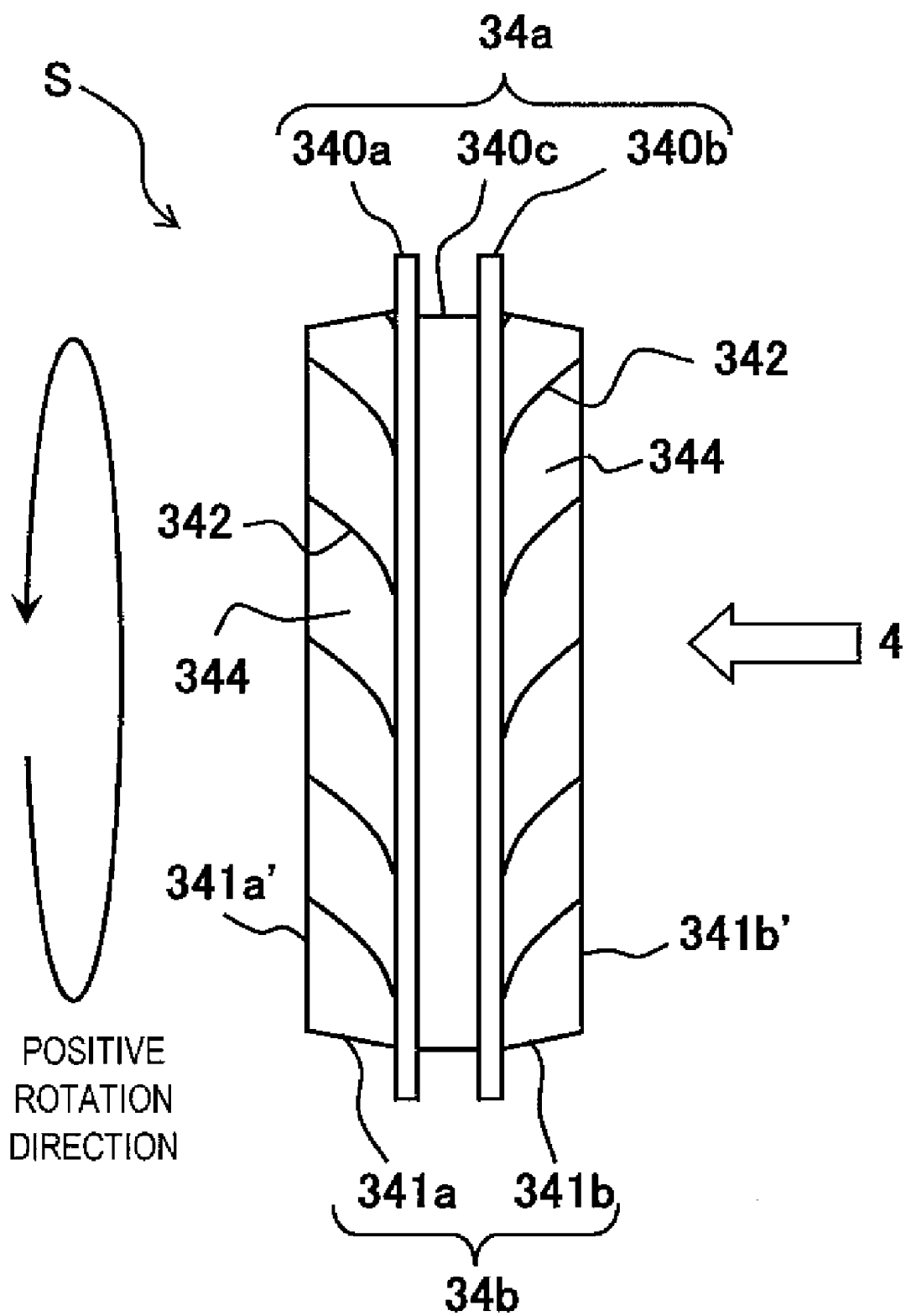
FIG. 3 is an enlarged simplified side elevational view of a synchronizer sleeve as viewed in a direction substantially perpendicular to a rotational shaft in accordance with the first embodiment of the present invention.

Referring now to FIGS. 3 and 4, the structure of the synchronizer sleeve 34 in accordance with the first embodiment of the present invention will be described in more detail. FIG. 3 is an enlarged simplified side elevational view of the synchronizer sleeve 34 as viewed in a direction substantially perpendicular to the rotational shaft (e.g., the counter shaft 3 or the output shaft 4). FIG. 4 is an enlarged simplified front elevational view of the synchronizer sleeve 34 as viewed in a direction of an arrow 4 in FIG. 3 that is substantially parallel to the rotational shaft (e.g., the counter shaft 3 or the output shaft 4).

As shown in FIG. 3, an outer circumferential surface of the synchronizer sleeve 34 includes a shift fork engagement part 34a and a projection part 34b. The shift fork engagement part 34a is configured and arranged to engage with a shift fork (not shown). The projection part 34b protrudes from both side surfaces of the shift fork engagement part 34a in the axial direction.

The shift fork engagement part 34a of the synchronizer sleeve 34 includes a pair of annular wall surfaces 340a and 340b that protrude in a radial outward direction from the outer circumferential surface of the synchronizer sleeve 34 with an annular groove 340c being formed between the annular wall surfaces 340a and 340b. The annular groove 340c forms an engagement surface that is configured and arranged to engage with the shift fork (not shown). More specifically, the shift fork engagement part 34a is configured and arranged to engage with the shift fork so that the shift fork is sandwiched between the annular wall surfaces 340a and 340b.

The projection part 34b includes a pair of projecting sections 341a and 341b that protrude outwardly in the axial direction from axial end sections of the annular wall surfaces 340a and 340b of the shift fork engagement part 34a, respectively. In the first embodiment of the present invention, the projecting sections 341a and 341b of the projection part 34b include a guide section configured and arranged to guide at least a portion of the lubricating oil supplied from the lubricating oil supplying system 20 to the shift fork engagement part 34a of the synchronizer sleeve 34 toward the corresponding clutch gear 39 and the synchronizer ring 38. In the first embodiment, the guide section has a plurality of first wall surfaces 344 formed on each of the projecting sections 341a and 341b of the projection part 34b. Moreover, a plurality of second wall surfaces 342 are provided on each of the projecting sections 341a and 341b such that two adjacent first wall surfaces 344 are separated by the second wall surface 342 as shown in FIGS. 3 and 4. In other words, the first wall surfaces 344 are spaced apart in the circumferential direction with the second wall surfaces 342 being interposed therebetween. The first wall surfaces 344 extend generally in the circumferential direction of the projecting sections 341a and 341b, and the second wall surfaces 342 extend generally in the radial direction of the projecting sections 341a and 341b as seen in FIG. 4. Thus, the first wall surfaces 344 and the second wall surfaces 342 together form a plurality of guiding grooves.

Each of the second wall surfaces 342 generally faces a positive rotation direction of the synchronizer sleeve 34. As used herein, the "positive rotation direction of the synchronizer sleeve 34" refers to a rotation direction of the synchronizer sleeve 34 when the transmission 1 is driven in one of the forward gear speeds. Moreover, as best shown in FIG. 3, in the first embodiment of the present invention, each of the second wall surfaces 342 is slanted with respect to the axial direction of the synchronizer sleeve 34 in a gradual curve in a direction opposite a positive rotation direction of the synchronizer sleeve 34. In other words, each of the second wall surfaces 342 is slanted with respect to the axial direction of the synchronizer sleeve 34 so that each of the guiding grooves (the second wall surfaces 342) has an inner end positioned at the axial end section of corresponding one of the engagement annular wall surfaces 340a and 340b and an outer end positioned at corresponding one of the axial free end portions 341a' and 341b' of the projection part 34b, with the inner ends being more advanced than the outer ends with respect to the positive rotation direction of the synchronizer sleeve 34. Furthermore, each of the first wall surfaces 344 (and each of the second wall surfaces 342) extends from the annular wall surfaces 340a and 340b to axial free end portions 341a' and 341b' of the projecting sections 341a and 341b, respectively. Also, each of the first wall surfaces 344 is slanted downwardly (i.e., toward the rotational shaft) from the axial end sections of the annular wall surfaces 340a and 340b toward the corresponding one of the axial free end portions 341a' and 341b' of the projecting sections 341a and 341b. Moreover, as best seen in FIG. 4, each of the first wall surfaces 344 is slanted downward (i.e., toward a center axis of the rotational shaft) in the direction opposite the positive rotation direction of the synchronizer sleeve 34 between an adjacent pair of the second wall surfaces 342.

Figure 5:
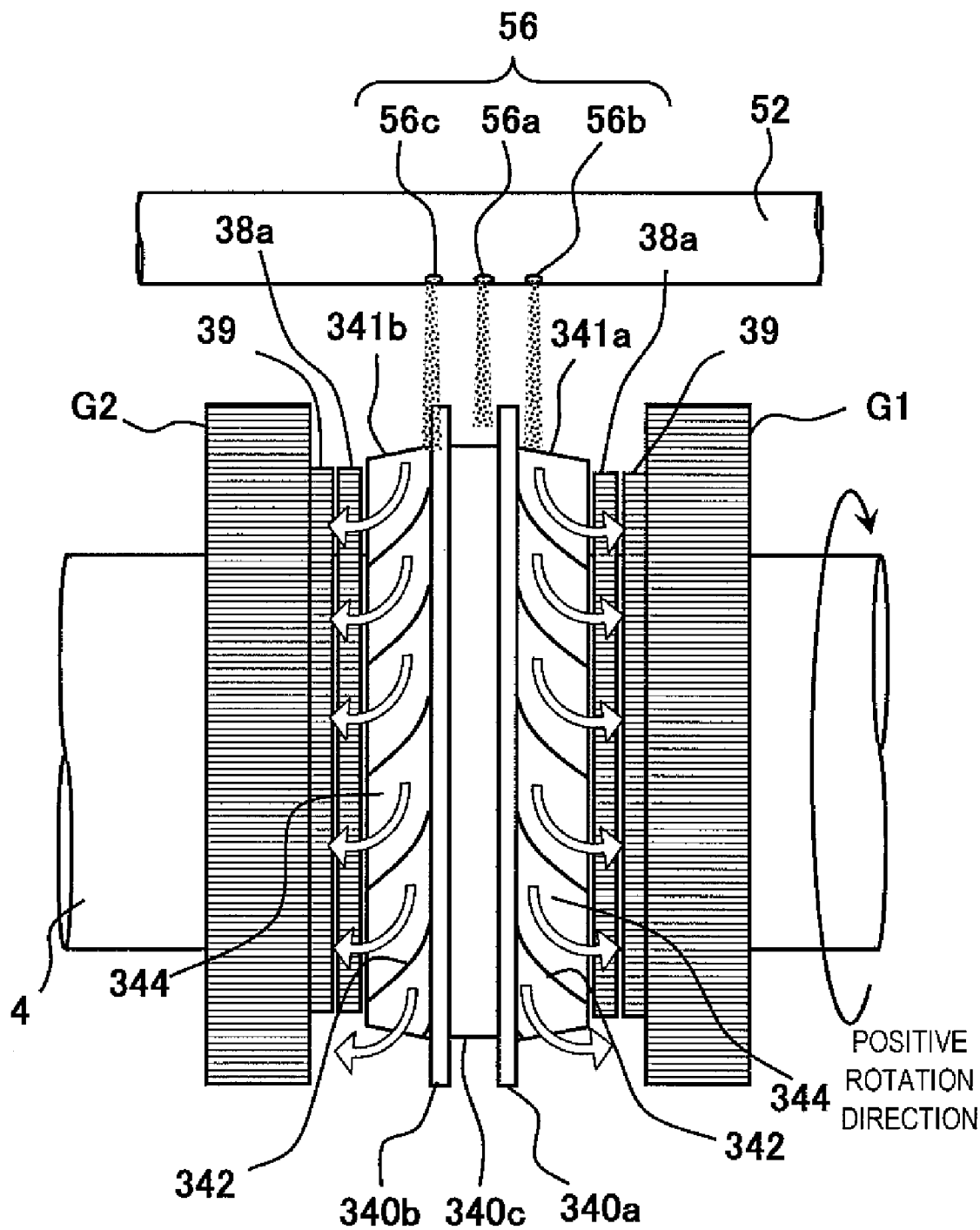
FIG. 5 is an enlarged simplified side elevational view illustrating arrangements of the oil supply pipe and the synchronizer sleeve in a state in which lubricating oil is supplied to a shift fork engagement part of the synchronizer sleeve when the synchronizer sleeve is in a neutral position in accordance with the first embodiment of the present invention.

FIG. 5 is an enlarged simplified side elevational view illustrating arrangements of the through holes 56 of the oil supply pipe 52 in the vicinity of the synchronizer sleeve 34 in accordance with the first embodiment. As mentioned above, the oil supply pipe 52 of the lubricating oil supplying system 20 includes the through holes 54 and 56 (FIG. 1). The through holes 56 are formed in positions that correspond to positions of the shift fork engagement part 34a of the synchronizer sleeve 34 when the synchronizer sleeve 34 is in the neutral state or in one of the gear-shifting states. Therefore, the shift fork engagement part 34a of the synchronizer sleeve 34 is lubricated using the lubricating oil flowing out from the through holes 56.

As shown in FIG. 5, the through holes 56 of the oil supply pipe 52 include a plurality of through holes 56a, 56b and 56c. The through hole 56a (second through hole) is formed in a position that corresponds to a position of the shift fork engagement part 34a when the synchronizer sleeve 34 has not been moved toward one of the driving gears G1 and G2 (i.e., when the synchronizer sleeve 34 is in a neutral position or state). The through holes 56b and 56c (first through hole) are formed in positions that correspond to positions of the shift fork engagement part 34a when the synchronizer sleeve 34 has been moved toward one of the driving gears G1 and G2 (i.e., when the synchronizer sleeve 34 is in a geared or gear-shifting position). Therefore, the lubricating oil can be properly supplied to the shift fork engagement part 34a of the synchronizer sleeve 34 regardless of the position of the synchronizer sleeve 34.

Figure 6:
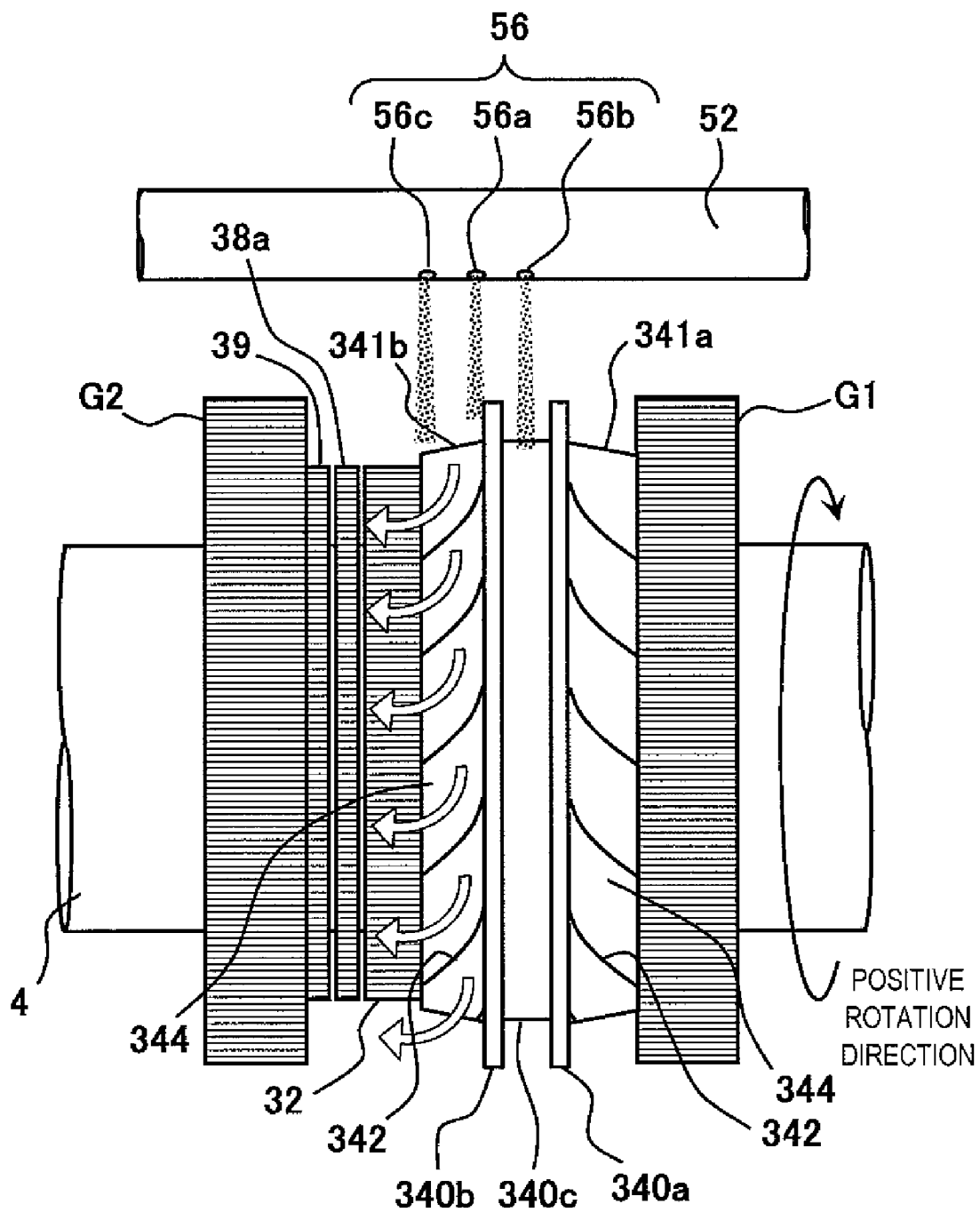
FIG. 6 is an enlarged simplified side elevational view illustrating arrangements of the oil supply pipe and the synchronizer sleeve in a state in which the lubricating oil is supplied to the shift fork engagement part of the synchronizer sleeve when the synchronizer sleeve is in a first gear-shifting position in accordance with the first embodiment of the present invention.
Figure 7:
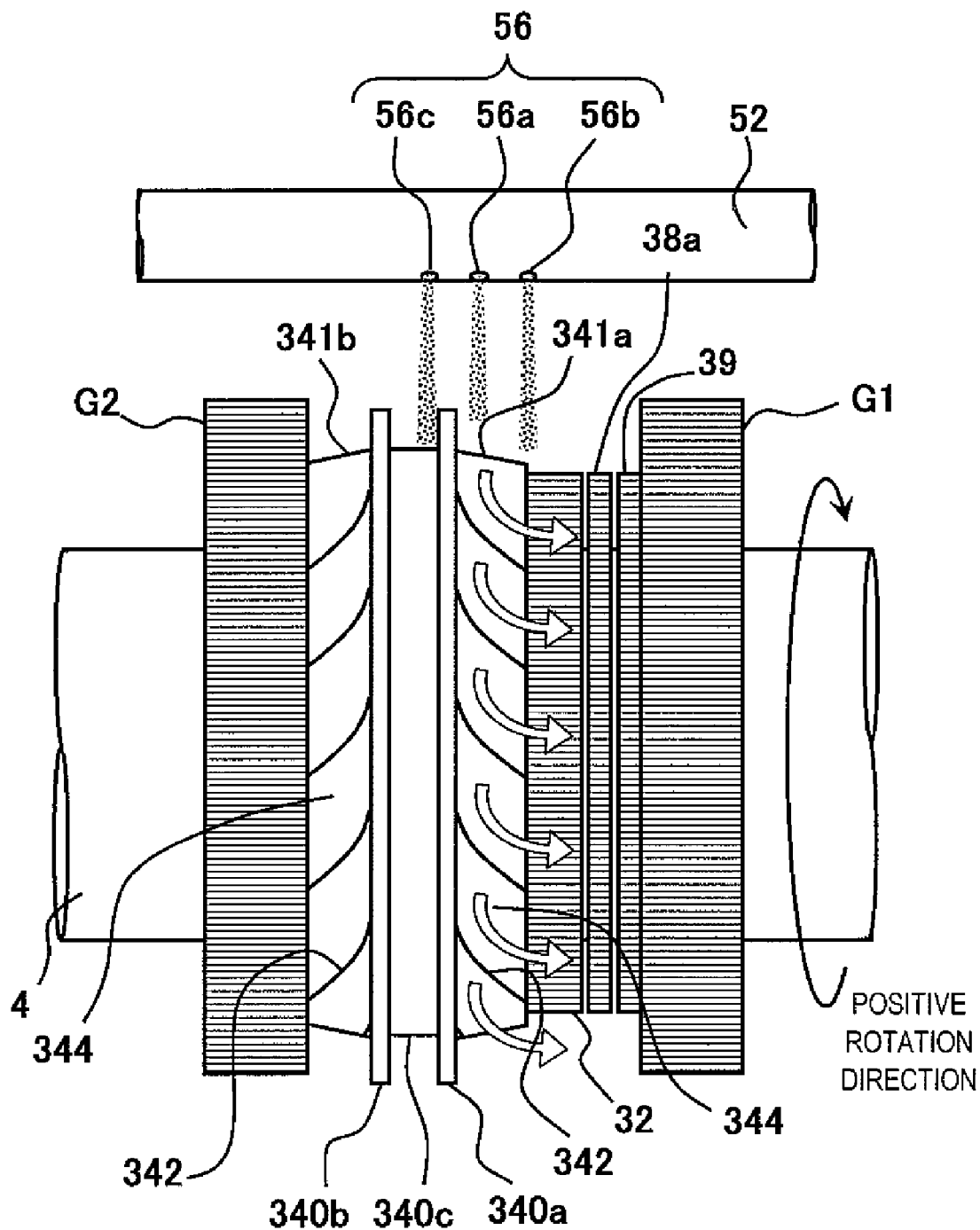
FIG. 7 is an enlarged simplified side elevational view illustrating arrangements of the oil supply pipe and the synchronizer sleeve in a state in which the lubricating oil is supplied to the shift fork engagement part of the synchronizer sleeve when the synchronizer sleeve is in a second gear-shifting position in accordance with the first embodiment of the present invention.

Referring now to FIGS. 5 to 7, the operation of the transmission 1 of the first embodiment as well as the flow of the lubricating oil supplied to the synchronizer sleeve 34 will be described in more detail.

More specifically, FIG. 5 illustrates the arrangements of the oil supply pipe 52 and the synchronizer sleeve 34 in a state in which the lubricating oil is supplied to the shift fork engagement part 34a when the synchronizer sleeve 34 is in the neutral position. FIG. 6 is an enlarged simplified side elevational view illustrating arrangements of the oil supply pipe 52 and the synchronizer sleeve 34 in a state in which the lubricating oil is supplied to the shift fork engagement part 34a when the synchronizer sleeve 34 is in a first gear-shifting position (e.g., in this example, the gear shifting position for engaging the driving gear G1). FIG. 7 is an enlarged simplified side elevational view illustrating arrangements of the oil supply pipe 52 and the synchronizer sleeve 34 in a state in which the lubricating oil is supplied to the shift fork engagement part 34a when the synchronizer sleeve 34 is in a second gear-shifting position (e.g., in this example, the gear shifting position for engaging the driving gear G2).

When the synchronizer sleeve 34 is in the neutral position as shown in FIG. 5, the lubricating oil flowing out from the through hole 56a is supplied to the shift fork engagement part 34a of the synchronizer sleeve 34. In such case, the lubricating oil flowing out from the through holes 56b and 56c is supplied to the projecting sections 341a and 341b of the projection part 34b respectively. Thus, the lubricating oil supplied to the projecting sections 341a and 341b is carried to the second wall surfaces 342 formed on the projecting sections 341a and 341b as the synchronizer sleeve 34 rotates in the positive rotation direction, and dispersed toward the ring splines 38a and the clutch gears 39. As mentioned above, the second wall surfaces 342 are slanted with respect to the axial direction of the synchronizer sleeve 34 in a gradual curve in the direction opposite the positive rotation direction of the synchronizer sleeve 34. Therefore, a force component oriented outward in the axial direction (i.e., in the directions of the ring splines 38a and the clutch gears 39) acts on the lubricating oil that has collided with the second wall surfaces 342. Thus, the lubricating oil is adequately dispersed toward the ring splines 38a and the clutch gears 39. Since the first wall surfaces 344 are slanted downwardly in the direction opposite the positive rotation direction of the synchronizer sleeve 34 (i.e., slanted downwardly toward the second wall surfaces 342) as shown in FIG. 4, the lubricating oil supplied to the projection part 34b can be carried by the second wall surfaces 342 efficiently.

Since the first wall surfaces 344 extend between the annular wall surfaces 340a and 340b to the axial free end portions 341a' and 341b' of the projection part 34b, respectively, and the first wall surfaces 344 are slanted downwardly toward the axial free end portions 341a' and 341b', the lubricating oil supplied to the projecting sections 341a and 341b of the projection part 34b can be effectively guided toward the ring splines 38a and the clutch gears 39. Of course, it will be apparent to those skilled in the art from this disclosure that when the lubricating oil is supplied to the shift fork engagement part 34a from the through hole 56a, the lubricating oil that is dispersed from the shift fork engagement part 34a and supplied to the projection part 34b can also be effectively guided toward the ring splines 38a and the clutch gears 39 by the second wall surfaces 342 and the first wall surfaces 344 in the same manner as the lubricating oil supplied to the projecting sections 341a and 341b of the projection part 34b from the through holes 56b and 56c.

When the synchronizer sleeve 34 is in the first gear-shifting position as shown in FIG. 6, the lubricating oil flowing out from the through hole 56b disposed in the position that corresponds to the shift fork engagement part 34a in the first gear-shifting position is supplied to the shift fork engagement part 34a. In such case, the lubricating oil flowing out from the through holes 56a and 56c is supplied to the projecting section 341b of the projection part 34b, and the lubricating oil is carried to the second wall surfaces 342 of the projecting section 341b as the synchronizer sleeve 34 rotates in the positive rotation direction. Thus, the lubricating oil is dispersed toward the ring spline 38a and the clutch gear 39 disposed on the side of the driving gear G2 as shown in FIG. 6.

Likewise, when the synchronizer sleeve 34 is in the second gear-shifting position as shown in FIG. 7, the lubricating oil flowing out from the through hole 56c disposed in the position that corresponds to the shift fork engagement part 34a is supplied to the shift fork engagement part 34a. In such case, the lubricating oil flowing out from the through holes 56a and 56b is supplied to the projecting section 341a of the projection part 34b, and the lubricating oil is carried to the second wall surfaces 342 of the projecting section 341a as the synchronizer sleeve 34 rotates in the positive rotation direction. Thus, the lubricating oil is dispersed toward the ring spline 38a and the clutch gear 39.

Therefore, with the first embodiment of the present invention, even when the synchronizer sleeve 34 is in a gear-shifting position (e.g., the first or second gear-shifting position), the lubricating oil supplied to the projection part 34b is properly and efficiently dispersed toward the ring spline 38a and the clutch gear 39 via the second wall surfaces 342 and the first wall surfaces 344 of the projection part 34b in the same manner as when the synchronizer sleeve 34 is in the neutral position. Of course, it will be apparent to those skilled in the art from this disclosure that when the lubricating oil is supplied to the shift fork engagement part 34a from the through hole 56b in the first gear-shifting position and from the through hole 56c in the second gear-shifting position, the lubricating oil dispersed from the shift fork engagement part 34a and supplied to the projection part 34b can also be effectively guided toward the ring spline 38a and the clutch gear 39 by the second wall surfaces 342 and the first wall surfaces 344.

According to the transmission 1 of the first embodiment described above, the guiding grooves are formed by the first wall surfaces 344 and the second wall surfaces 342 formed on the projecting sections 341a and 341b as being spaced apart in the circumferential direction with the second wall surfaces 342 being interposed therebetween. Therefore, when the lubricating oil is supplied from one of the three through holes 56a, 56b and 56c formed in the oil supply pipe 52 to the shift fork engagement part 34a of the synchronizer sleeve 34, the lubricating oil flowing out from the rest of the through holes 56a, 56b and 56c can be properly supplied to the ring spline 38a and the clutch gear 39 via the second wall surfaces 342 and the first wall surfaces 344. Therefore, the lubricating oil can be used efficiently because the lubricating oil flowing out from the rest of the through holes 56a, 56b and 56c other than the one of the through holes 56a, 56b, 56c, which supplies the lubricating oil to the shift fork engagement part 34a, are used to lubricate the corresponding ring spline 38a and the corresponding clutch gear 39. Of course, it will be apparent to those skilled in the art from this disclosure that when the lubricating oil is supplied to the shift fork engagement part 34a, the lubricating oil that is dispersed from the shift fork engagement part 34a and is supplied to the projection part 34b can also be effectively guided toward the corresponding ring spline 38a and the corresponding clutch gear 39 by the second wall surfaces 342 and the first wall surfaces 344.

Moreover, according to the transmission 1 of the first embodiment, the second wall surfaces 342 are slanted with respect to the axial direction of the synchronizer sleeve 34 in a gradual curve in the direction opposite the positive rotation direction of the synchronizer sleeve 34. Therefore, a force component oriented outward in the axial direction (i.e., in the direction of the corresponding ring spline 38a and the corresponding clutch gear 39) acts on the lubricating oil that has collided against the second wall surfaces 342, and thus, the lubricating oil can be properly guided toward the corresponding ring spline 38a and the corresponding clutch gear 39. Since the first wall surfaces 344 are slanted downwardly in the direction opposite the positive rotation direction of the synchronizer sleeve 34 (i.e., slanted downwardly toward the second wall surfaces 342) as shown in FIG. 4, the lubricating oil supplied to the projection part 34b can be carried and guided efficiently.

According to the transmission 1 of the first embodiment, the first wall surfaces 344 extend between the annular wall surfaces 340a and 340b to the axial free end portions 341a' and 341b' of the projection part 34b and the first wall surfaces 344 are slanted downwardly toward the axial free end portions 341a' and 341b'. Therefore the lubricating oil supplied to the projection part 34b can be effectively guided toward the corresponding ring splines 38a and the corresponding clutch gears 39.

Second Embodiment

Referring now to FIGS. 8-11, a transmission 100 having a synchronizing mechanism in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 8:
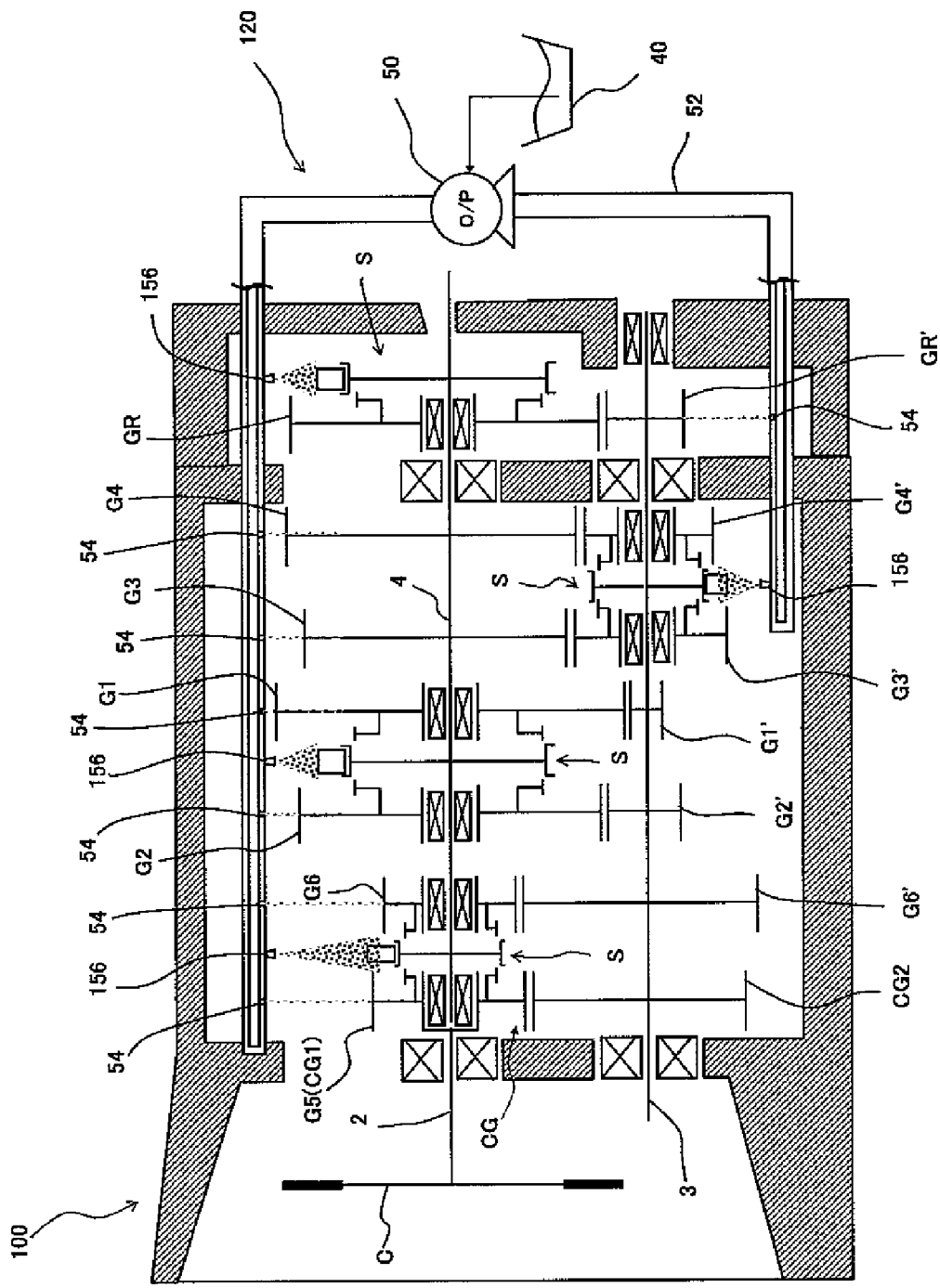
FIG. 8 is a simplified overall schematic view of a transmission having a synchronizing mechanism in accordance with a second embodiment of the present invention.

FIG. 8 is a simplified overall schematic view of the transmission 100 having a synchronizing mechanism in accordance with the second embodiment. The transmission 100 of the second embodiment has a configuration identical to the transmission 1 of the first embodiment except that the lubricating oil supplying system 20 of the first embodiment is replaced with a lubricating oil supplying system 120. More specifically, the lubricating oil supplying system 120 of the second embodiment differs from the lubricating oil supplying system 20 of the first embodiment in that a plurality of spray nozzles 156 (aperture parts) are provided in the oil supply pipe 52 in the second embodiment instead of the through holes 56 of the first embodiment.

As shown in FIG. 8, the lubricating oil supplying system 120 provided to the transmission 100 of the second embodiment includes the conventional oil pump 50, the oil pan 40, and the oil supply pipe 52. The oil pump 50 is configured and arranged to siphon and discharge the lubricating oil in the oil pan 40. The oil supply pipe 52 forms a channel for conveying the lubricating oil discharged by the oil pump 50. As in the first embodiment, the oil supply pipe 52 of the lubricating oil supplying system 120 is provided with the through holes 54 disposed in positions that correspond to the engagement surfaces of the driving gears G1, G2, G3, G4, G5, G6 and GR and the driven gears G1', G2', G3', G4', CG2, G6' and GR', respectively for lubricating the engagement surfaces. Moreover, the oil supply pipe 52 of the lubricating oil supplying system 120 is configured and arranged to lubricate the shift fork engagement parts 34a of the synchronizer sleeves 34 using the lubricating oil sprayed from the spray nozzles 156 provided to the oil supply pipe 52 in positions that correspond to the shift fork engagement parts 34a of the synchronizer sleeves 34 when the synchronizer sleeves 34 are in the neutral state.

The spray nozzles 156 are configured and arranged to diffuse and spray the lubricating oil in the form of a mist to allow the lubricating oil to be supplied to the shift fork engagement parts 34a regardless of whether the synchronizer sleeves 34 are in the neutral position, the first gear-shifting position, or the second gear-shifting position.

Figure 9:
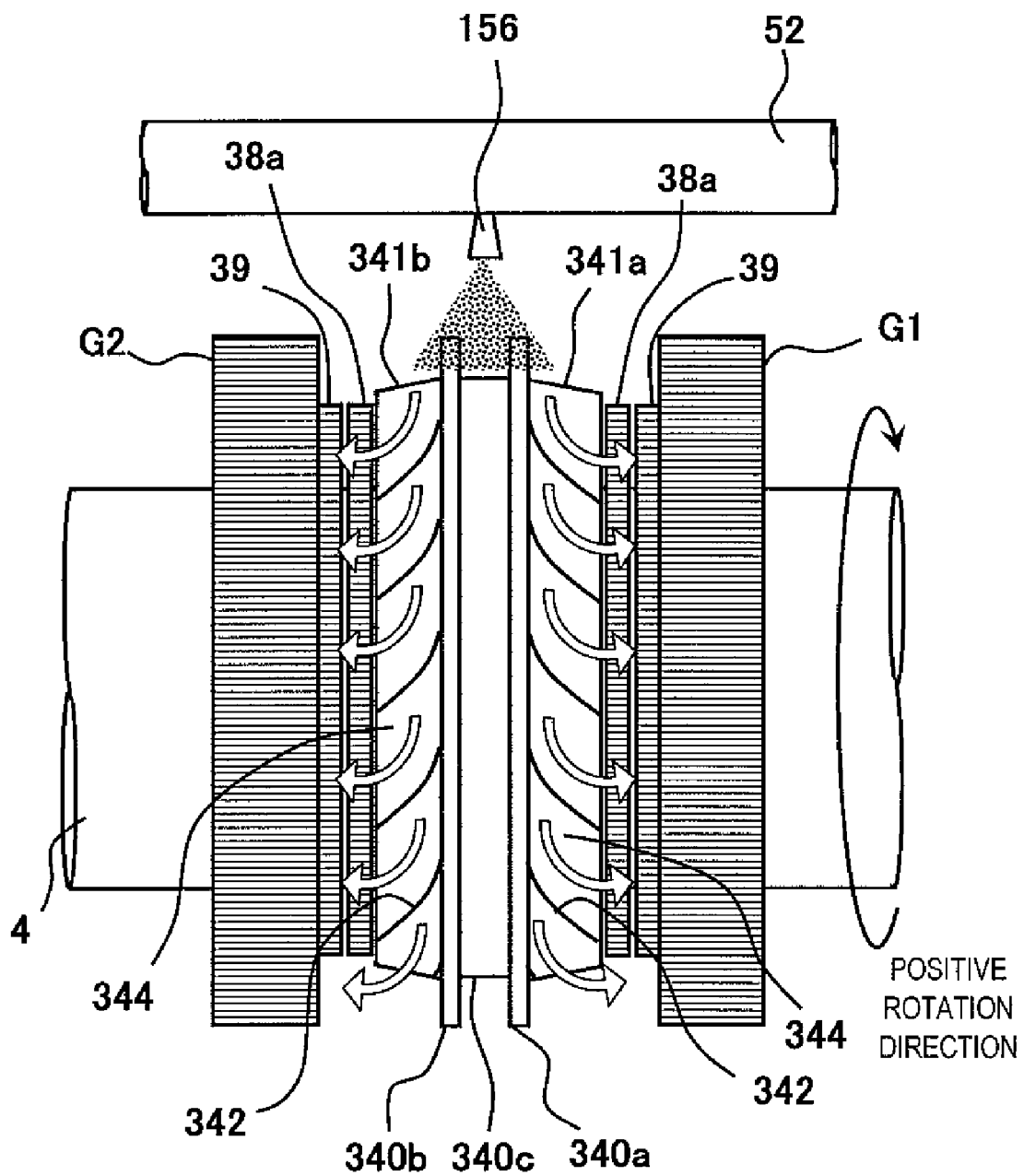
FIG. 9 is an enlarged simplified side elevational view illustrating arrangements of an oil supply pipe and a synchronizer sleeve in a state in which lubricating oil is supplied to a shift fork engagement part of the synchronizer sleeve when the synchronizer sleeve is in a neutral position in accordance with the second embodiment of the present invention.
Figure 10:
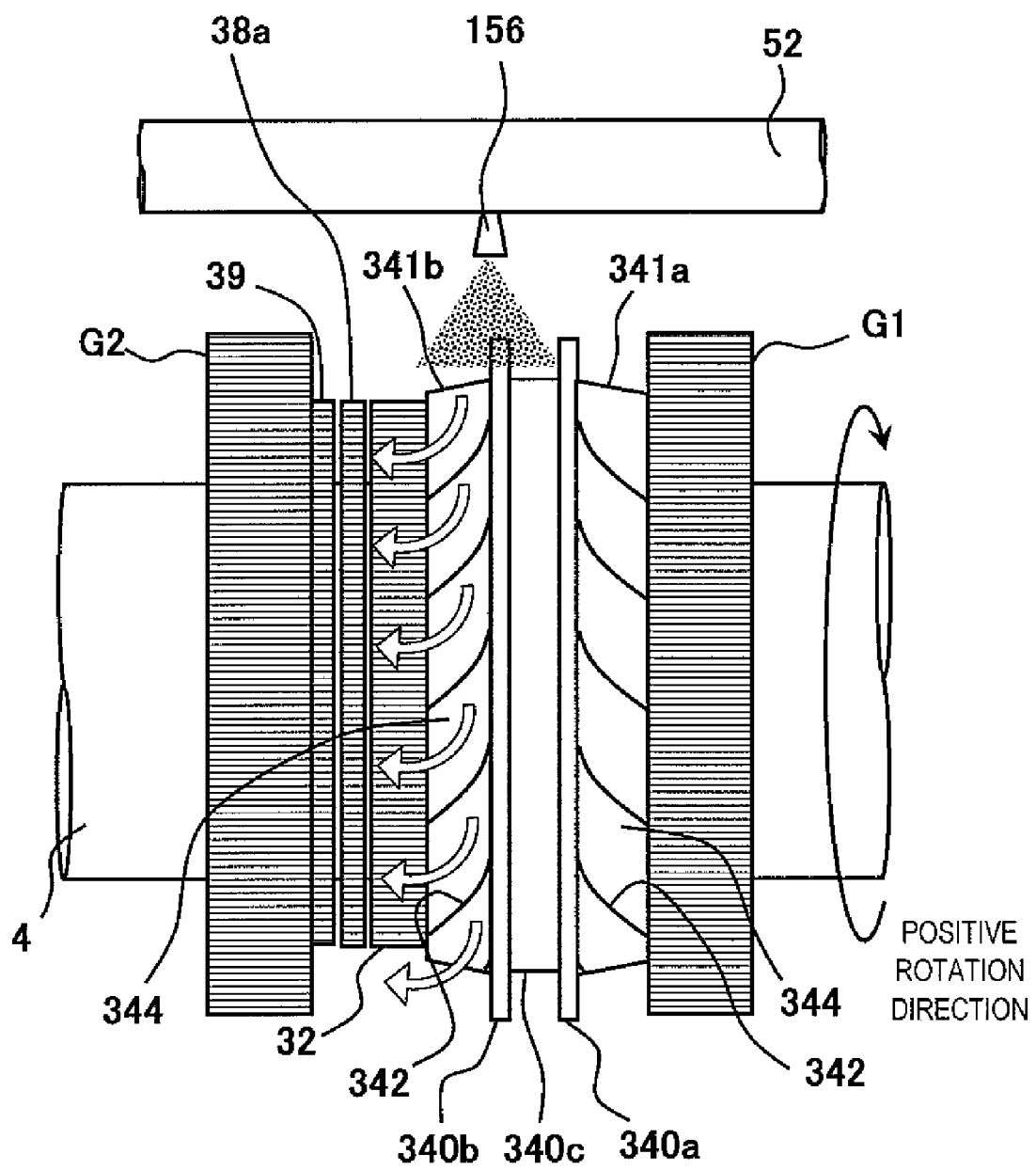
FIG. 10 is an enlarged simplified side elevational view illustrating arrangements of the oil supply pipe and the synchronizer sleeve in a state in which the lubricating oil is supplied to the shift fork engagement part of the synchronizer sleeve when the synchronizer sleeve is in a first gear-shifting position in accordance with the second embodiment of the present invention.
Figure 11:
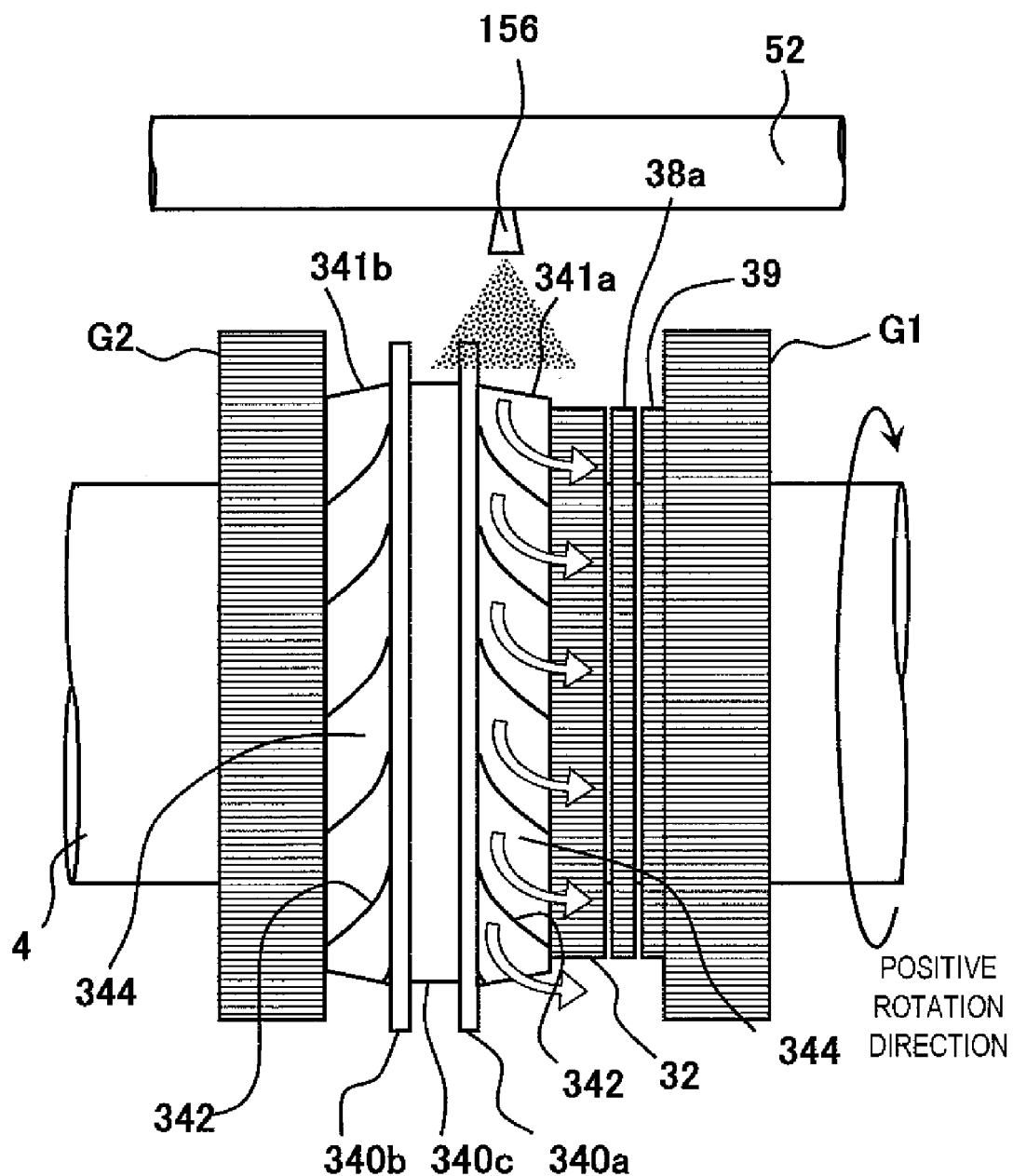
FIG. 11 is an enlarged simplified side elevational view illustrating arrangements of the oil supply pipe and the synchronizer sleeve in a state in which the lubricating oil is supplied to the shift fork engagement part of the synchronizer sleeve when the synchronizer sleeve is in a second gear-shifting position in accordance with the second embodiment of the present invention.

Referring now to FIGS. 9 to 11, the operation of the transmission 100 of the second embodiment as well as the flow of the lubricating oil supplied to the shift fork engagement parts 34a of the synchronizer sleeves 34 will be described in more detail. In FIGS. 9-11, the synchronizing device S disposed between the driving gears G1 and G2 is used as an example for explaining the operation of the synchronizing device S.

FIG. 9 is an enlarged simplified side elevational view illustrating arrangements of the oil supply pipe 52 and the synchronizer sleeve 34 in a state in which lubricating oil is supplied to the shift fork engagement part 34a of the synchronizer sleeve 34 when the synchronizer sleeve 34 is in a neutral position. FIG. 10 is an enlarged simplified side elevational view illustrating arrangements of the oil supply pipe 52 and the synchronizer sleeve 34 in a state in which the lubricating oil is supplied to the shift fork engagement part 34a of the synchronizer sleeve 34 when the synchronizer sleeve 34 is in a first gear-shifting position (e.g., in this example, the gear-shifting position for engaging the driving gear G1). FIG. 11 is an enlarged simplified side elevational view illustrating arrangements of the oil supply pipe 52 and the synchronizer sleeve 34 in a state in which the lubricating oil is supplied to the shift fork engagement part 34a of the synchronizer sleeve 34 when the synchronizer sleeve is in a second gear-shifting position (e.g., in this example, the gear-shifting position for engaging the driving gear G2).

When the synchronizer sleeve 34 is in the neutral position as shown in FIG. 9, the lubricating oil sprayed from the spray nozzle 156 is supplied to the shift fork engagement part 34a as well as to the projecting sections 341a and 341b of the projection part 34b. The lubricating oil supplied to the projecting sections 341a and 341b of the projection part 34b is carried to the second wall surfaces 342 as the synchronizer sleeve 34 rotates in the positive rotation direction, and dispersed toward the corresponding ring spline 38a and the corresponding clutch gear 39. The second wall surfaces 342 are slanted with respect to the axial direction of the synchronizer sleeve 34 in a gentle curve in the direction opposite the positive rotation direction of the synchronizer sleeve 34. Therefore, a force component oriented outward in the axial direction (i.e., in the direction of the corresponding ring spline 38a and the corresponding clutch gear 39) acts on the lubricating oil that has collided against the second wall surfaces 342. Thus, the lubricating oil is adequately dispersed toward the corresponding ring spline 38*a* and the corresponding clutch gear 39. Since the first wall surfaces 344 are slanted downwardly in the direction opposite the positive rotation direction of the synchronizer sleeve 34 (i.e., slanted downwardly toward the second wall surfaces 342) the lubricating oil supplied to the projecting sections 341*a* and 341*b* of the projection part 34*b* can be carried and guided efficiently.

Since the first wall surfaces 344 extend between the annular wall surfaces 340*a* and 340*b* to the axial free end portions 341*a*' and 341*b*' of the projecting sections 341*a* and 341*b*, respectively, and the first wall surfaces 344 are slanted downwardly toward the axial free end portions 341*a*' and 341*b*' of the projecting sections 341*a* and 341*b*, the lubricating oil supplied to the projecting sections 341*a* and 341*b* can be effectively guided toward the corresponding ring spline 38*a* and the corresponding clutch gear 39. Of course, it will be apparent to those skilled in the art from this disclosure that when lubricating oil is supplied to the shift fork engagement part 34*a* from the spray nozzle 156, the lubricating oil that is dispersed from the shift fork engagement part 34*a* and supplied to the projecting sections 341*a* and 341*b* of the projection part 34*b* can also be effectively guided toward the corresponding ring spline 38*a* and the corresponding clutch gear 39 via the second wall surfaces 342 and the first wall surfaces 344 in the same manner as the lubricating oil supplied to the projecting sections 341*a* and 341*b* of the projection part 34*b* from the spray nozzle 156.

Even when the synchronizer sleeve 34 is in the first or second gear-shifting position as shown in FIG. 10 or 11, the lubricating oil sprayed from the spray nozzle 156 is supplied to the shift fork engagement part 34*a*, and the lubricating oil supplied to the corresponding one of the projecting sections 341*a* and 341*b* of the projection part 34*b* is carried to the second wall surfaces 342 as the synchronizer sleeve 34 rotates in the positive rotation direction. Thus, the lubricating oil is dispersed toward the corresponding ring spline 38*a* and the corresponding clutch gear 39. Therefore, even when the synchronizer sleeve 34 is in a gear-shifting position (e.g., the first or second gear-shifting position), the lubricating oil supplied to the corresponding one of the projecting sections 341*a* and 341*b* of the projection part 34*b* is properly and efficiently dispersed toward the corresponding ring spline 38*a* and the corresponding clutch gear 39 via the second wall surfaces 342 and the first wall surfaces 344 in the same manner as when the synchronizer sleeve 34 is in the neutral position.

Similarly to the transmission 1 of the first embodiment, in the transmission 100 of the second embodiment described above, the first wall surfaces 344 are formed on the projecting sections 341*a* and 341*b* of the projection part 34*b* of the synchronizer sleeve 34. The first wall surfaces 344 are spaced apart in the circumferential direction with the second wall surfaces 342 being interposed therebetween so that the guiding grooves are formed by the first and second wall surfaces 344 and 342. Therefore, a portion of the lubricating oil sprayed toward the shift fork engagement part 34*a* from the spray nozzle 156 provided to the oil supply pipe 52 can be properly supplied to the corresponding ring spline 38*a* and the corresponding clutch gear 39 via the second wall surfaces 342 and the first wall surfaces 344. The lubricating oil can be used efficiently because the lubricating oil sprayed out in the form of a mist from the spray nozzle 156 is used to lubricate the shift fork engagement part 34*a*, the ring splines 38*a*, and the clutch gears 39.

Figure 12:
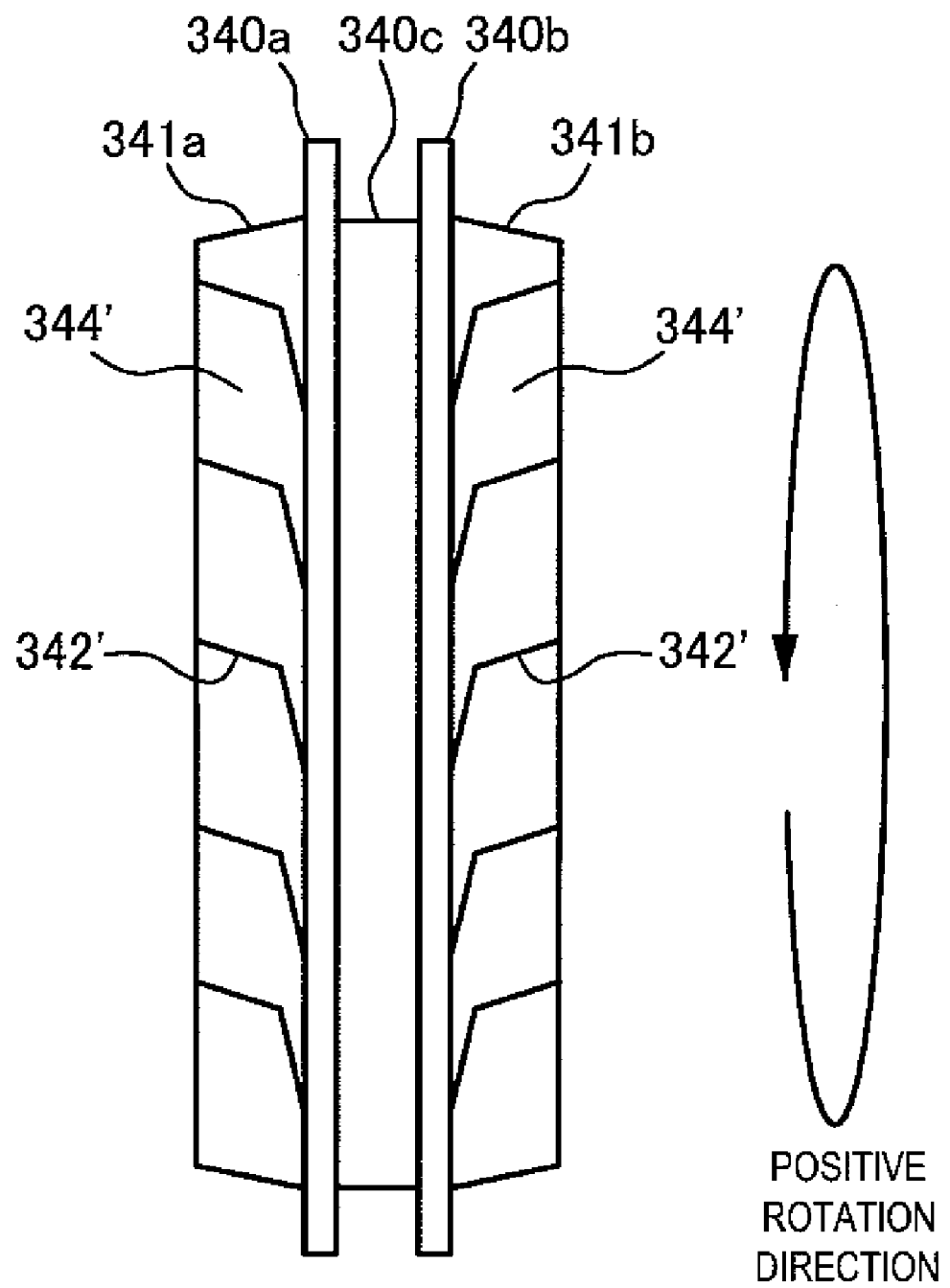
FIG. 12 is an enlarged simplified side elevational view of a synchronizer sleeve as viewed in a direction substantially perpendicular to a rotational shaft in accordance with a modified embodiment of the present invention.

In the transmissions 1 and 100 of the first and second embodiments, the second wall surfaces 342 are slanted with respect to the axial direction of the synchronizer sleeve 34 in a gentle curve in the direction opposite the positive rotation direction of the synchronizer sleeve 34. However, the structure of the second wall surfaces 342 is not limited to being curved or being slanted. For example, as shown a modified structure of the synchronizer sleeve 34 illustrated in FIG. 12, the synchronizer sleeve 34 may be provided with a plurality guiding grooves formed by a plurality of first wall surfaces 344' that are spaced apart in the circumferential direction with a plurality of second wall surfaces 342' being interposed therebetween. As shown in FIG. 12, the guiding grooves formed by the second wall surfaces 342' and the first wall surfaces 344' can be arranged to bend at an angle in the direction opposite the positive rotation direction of the synchronizer sleeve 34.

In the transmissions 1 and 100 of the first and second embodiments, the first wall surfaces 344 extend between the annular wall surfaces 340*a* and 340*b* of the shift fork engagement part 34*a* and the axial free end portions 341*a*' and 341*b*' of the projecting sections 341*a* and 341*b*, respectively. However, any configuration may be used as long as the lubricating oil supplied to the projection part 34*b* can be guided toward the corresponding ring spline 38*a* and the corresponding clutch gear 39. For example, the first wall surfaces 344 may be formed from a axial middle portion of the projecting sections 341*a* and 341*b* of the projection part 34*b* to the axial free end portions 341*a*' and 341*b*', or from the annular wall surfaces 340*a* and 340*b* to the axial middle portions of the projecting sections 341*a* and 341*b* of the projection part 34*b*.

In the transmissions 1 and 100 of the first and second embodiments, the first wall surfaces 344 are slanted downwardly from the annular wall surfaces 340*a* and 340*b* of the projection part 34*b* toward the axial free end portions 341*a*' and 341*b*'. However, the first wall surfaces 344 are not limited to such arrangements.

In the transmissions 1 and 100 of the first and second embodiments, the first wall surfaces 344 are slanted downwardly in the direction opposite the positive rotation direction of the synchronizer sleeve 34. However, the first wall surfaces 344 are not limited to being slanted in such arrangements.

In the transmissions 1 and 100 of the first and second embodiments, the positive rotation direction of the synchronizer sleeve 34 is defined as the rotation direction of the synchronizer sleeve 34 when the transmission 1 is driven in one of the forward gear speeds. Instead, the positive rotation direction of the synchronizer sleeve 34 in the present invention may also be defined as the rotation direction of the synchronizer sleeve 34 when the transmission 1 is driven in the reverse gear speed.

In the first and second embodiments of the present invention, since at least a portion of the lubricating oil supplied to the synchronizer sleeve 34 is guided to the synchronizer ring 38 and the clutch gear 39 in the synchronizing mechanism of the present invention, the synchronizer ring 38 and the clutch gear 39 can be properly lubricated regardless of the axial length of the synchronizer sleeve 34.

Moreover, in the first and second embodiment of the present invention, the synchronizer sleeve 34 includes the projection part 34*b* (i.e., the projecting section 341*a* or 341*b*) that is formed on a lateral side of the shift fork engagement part 34*a* and that protrudes in the axial direction. The guiding section includes the first wall surface 344 formed on an outer circumferential surface of the projection part 34*b*. According to such an arrangement, a structure in which at least a portion of the lubricating oil supplied to the synchronizer sleeve 34 is guided toward the synchronizer ring 38 and the clutch gear 39 can be readily achieved.

In the first and second embodiments of the present invention, the first wall surface 344 extends between the side of the shift fork engagement part 34a and the axial free end portion (e.g., the axial free end portion 341a' or 341b') of the projection part 34b. The lubricating oil supplied to the projection part 34b can thus be properly guided to the axial free end portion of the projection part 34b. As a result, the lubricating oil can be properly supplied to the synchronizer ring 38 and the clutch gear 39.

In the first and second embodiments of the present invention, the first wall surface 344 is slanted downwardly from the side of the shift fork engagement part 34a toward the axial free end portion (e.g., the axial free end portion 341a' or 341b') of the projection part 34b). The first wall surface 344 is also slanted downwardly in the direction opposite a positive rotation direction (prescribed rotation direction) of the synchronizer sleeve 34. Moreover, the first wall surface 344 is slanted with respect to the axial direction of the synchronizer sleeve 34 in the direction opposite the rotation direction of the synchronizer sleeve 34. According to such an arrangement, the lubricating oil supplied to the projection part 34b can be effectively guided to the axial free end portion of the projection part 34b. As a result, the lubricating oil can be effectively supplied to the synchronizer ring 38 and the clutch gear 39.

In the first and second embodiments of the present invention, the first wall surface 344 gradually curves in the direction opposite the prescribed rotation direction. Alternatively, the first wall surface 344 can be formed to bend at an angle in the direction opposite the prescribed rotation direction. According to such an arrangement, the lubricating oil supplied to the projection part 34b can be effectively guided to the axial free end portion of the projection part 34b. As a result the lubricating oil can be effectively supplied to the synchronizer ring 38 and the clutch gear 39.

The transmissions 1 and 100 of the first and second embodiments can achieve the effects achieved by the synchronizing mechanism of the present invention; e.g., the effect wherein the synchronizer ring 38 and the clutch gear 39 can be properly lubricated regardless of the axial length of the synchronizer sleeve 34, and the effect wherein a structure in which at least a portion of the lubricating oil supplied to the synchronizer sleeve 34 is guided toward the synchronizer ring 38 and the clutch gear 39 can be easily achieved. As a result, the lubricating oil can be used efficiently in the transmissions 1 and 100 of the first and second embodiments.

In the transmission 1 and 100 of the first and second embodiments of the present invention, the lubricating oil supplying system 20 includes the lubricating oil supply pipe 52 positioned near the shift fork engagement parts 34a of the synchronizer sleeves 34. The through holes 56 forming supply ports for the lubricating oil are provided in the lubricating oil supply pipe 52. The oil pump 50 is configured to pump the lubricating oil into the lubricating oil supply pipe 52. The hydraulic circuit for supplying lubricating oil to the shift fork engagement parts 34a of the synchronizer sleeves 34 can thus be simplified.

The transmissions 1 and 100 of the first and second embodiments of the present invention includes the first through hole 56b or 56c formed in the lubricating oil supply pipe 52 for supplying the lubricating oil to the shift fork engagement part 34a when the synchronizer sleeve 34 is in the gear-shifting state and the second through hole 56a formed in the lubricating oil supply pipe 52 for supplying the lubricating oil to the shift fork engagement part 34a when the synchronizer sleeve 34 is in the neutral state. The guiding section (e.g., the first wall surfaces 344 and the second wall surfaces 342) is configured and arranged to supply the lubricating oil supplied from at least the second through hole 56a to the synchronizer ring 38 and/or the clutch gear 39 when the lubricating oil is supplied to the shift fork engagement part 34a from the first through hole 56b or 56c. The guiding section (e.g., the first wall surfaces 344 and the second wall surfaces 342) is configured and arranged to supply the lubricating oil supplied from at least the first through hole 56b or 56c to the synchronizer ring 38 and/or the clutch gear 39 when the lubricating oil is supplied to the shift fork engagement part 34a from the second through hole 56a. The lubricating oil can thus be used efficiently because the synchronizer ring 38 and the clutch gear 39 can be lubricated using the lubricating oil supplied from the through hole from among the first through hole and the second through hole that is not supplying lubricating oil to the shift fork engagement part 34a of the synchronizer sleeve 34 that engages with the shift fork. The lubricating oil can also be supplied to the shift fork engagement part 34a of the synchronizer sleeve 34 regardless of whether the synchronizer sleeve 34 is in the gear-shifting state or in the neutral state.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,""portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A synchronizing mechanism comprising:
a synchronizer hub fixedly coupled to a rotational shaft;
a coupling sleeve coupled to an outer circumference of the synchronizer hub with a spline engagement to slide with respect to the rotational shaft in an axial direction upon an operation of a shift fork;
a clutch gear rotatably supported on the rotational shaft; and
a synchronizer ring configured and arranged to produce a synchronized load between the coupling sleeve and the clutch gear,
the coupling sleeve including a shift fork engagement part, a projection part protruding from an axial end section of the shift fork engagement part in the axial direction, and a guide section including a guiding groove formed on an outer circumferential surface of the projection part, the guiding groove being configured and arranged to guide at least a portion of lubricating oil supplied from the shift fork engagement part toward at least one of the clutch gear and the synchronizer ring.

2. The synchronizing mechanism according to claim 1, wherein
the guiding groove extends between the axial end section of the shift fork engagement part of the coupling sleeve and an axial free end portion of the projection part of the coupling sleeve.

3. The synchronizing mechanism according to claim 2, wherein
the guiding groove is slanted downwardly toward a center axis of the coupling sleeve from the axial end section of the shift fork engagement part of the coupling sleeve to the axial free end portion of the projection part of the coupling sleeve.

4. The synchronizing mechanism according to claim 2, wherein
the guiding groove is slanted downwardly toward a center axis of the coupling sleeve in a direction opposite a prescribed rotation direction of the coupling sleeve.

5. The synchronizing mechanism according to claim 2, wherein
the guiding groove is slanted with respect to the axial direction of the coupling sleeve with the guiding groove having an inner end positioned at the axial end section of the shift fork engagement part and an outer end positioned at the axial free end portion of the projection part with the inner end being more advanced than the outer end with respect to a prescribed rotation direction of the coupling sleeve.

6. The synchronizing mechanism according to claim 5, wherein
the guiding groove gradually curves in a direction opposite the prescribed rotation direction.

7. The synchronizing mechanism according to claim 5, wherein
the guiding groove bends at an angle in a direction opposite the prescribed rotation direction.

8. A transmission including the synchronizing mechanism according to claim 1, further comprising
a lubricating oil supplying system configured and arranged to supply the lubricating oil to at least the shift fork engagement part of the coupling sleeve.

9. The transmission according to claim 8, wherein
the lubricating oil supplying system includes
a lubricating oil supply pipe having a supply port positioned in a vicinity of the shift fork engagement part of the coupling sleeve to supply the lubricating oil thereto, and
a pump device configured and arranged to pump the lubricating oil into the lubricating oil supply pipe.

10. The synchronizing mechanism according to claim 1, wherein
the synchronizer ring has a ring spline formed on an outer circumferential surface thereof and a friction cone surface formed on an inner circumferential surface thereof, and
the clutch gear has a friction cone surface configured and arranged to slide against the friction cone surface of the synchronizer ring.

11. A transmission comprising:
a synchronizing mechanism including
a synchronizer hub fixedly coupled to a rotational shaft,
a coupling sleeve coupled to an outer circumference of the synchronizer hub with a spline engagement to slide with respect to the rotational shaft in an axial direction upon an operation of a shift fork,
a clutch gear rotatably supported on the rotational shaft, and
a synchronizer ring configured and arranged to produce a synchronized load between the coupling sleeve and the clutch gear,
the coupling sleeve including a guide section configured and arranged to guide at least a portion of lubricating oil supplied from a shift fork engagement part of the coupling sleeve toward at least one of the clutch gear and the synchronizer ring; and
a lubricating oil supplying system configured and arranged to supply the lubricating oil to at least the shift fork engagement part of the coupling sleeve, the lubricating oil supplying system including
a lubricating oil supply pipe having a supply port positioned in a vicinity of the shift fork engagement part of the coupling sleeve to supply the lubricating oil thereto, and
a pump device configured and arranged to pump the lubricating oil into the lubricating oil supply pipe,
the supply port of the lubricating oil supply pipe further including a first through hole and a second through hole,
the first through hole being arranged to supply the lubricating oil to at least the shift fork engagement part of the coupling sleeve when the coupling sleeve is in a gear-shifting state and to supply the lubricating oil to at least the guide section when the coupling sleeve is in a neutral state, and
the second through hole being arranged to supply the lubricating oil to at least the guide section when the coupling sleeve is in a gear-shifting state and to supply the lubricating oil to at least the shift fork engagement part when the coupling sleeve is in a neutral state.

12. A transmission comprising:
a synchronizing mechanism including
a synchronizer hub fixedly coupled to a rotational shaft,
a coupling sleeve coupled to an outer circumference of the synchronizer hub with a spline engagement to slide with respect to the rotational shaft in an axial direction upon an operation of a shift fork,
a clutch gear rotatably supported on the rotational shaft, and
a synchronizer ring configured and arranged to produce a synchronized load between the coupling sleeve and the clutch gear,
the coupling sleeve including a guide section configured and arranged to guide at least a portion of lubricating oil supplied from a shift fork engagement part of the coupling sleeve toward at least one of the clutch gear and the synchronizer ring; and a lubricating oil supplying system configured and arranged to supply the lubricating oil to at least the shift fork engagement part of the coupling sleeve, the lubricating oil supplying system including
- a lubricating oil supply pipe having a supply port positioned in a vicinity of the shift fork engagement part of the coupling sleeve to supply the lubricating oil thereto, and
- a pump device configured and arranged to pump the lubricating oil into the lubricating oil supply pipe, the supply port of the lubricating oil supply pipe further including a spray nozzle configured and arranged to supply the lubricating oil to at least the shift fork engagement part of the coupling sleeve when the coupling sleeve is in a gear-shifting state and in a neutral state.

* * * * *